United States Patent [19]

Jackson

[11] 4,117,709
[45] Oct. 3, 1978

[54] CAMBER ADJUSTING TOOL

[76] Inventor: Edwin C. Jackson, 200 W. 22nd St., McMinnville, Oreg. 97128

[21] Appl. No.: 809,112

[22] Filed: Jun. 22, 1977

[51] Int. Cl.² ............................................. B21D 1/12
[52] U.S. Cl. ........................................ 72/386; 72/704
[58] Field of Search .......... 72/704, 316, 381, 386–390; 33/180 AT, 203, 203.18

[56] References Cited

U.S. PATENT DOCUMENTS

| 1,869,905 | 8/1932 | Marsh et al. | 72/704 X |
| 2,256,231 | 9/1941 | Bender | 72/704 X |
| 2,427,536 | 9/1947 | Simons | 72/704 X |
| 3,481,176 | 12/1969 | Horn | 72/704 X |
| 3,765,219 | 10/1973 | Easom, Jr. | 72/704 X |

*Primary Examiner*—C.W. Lanham
*Assistant Examiner*—D. M. Gurley
*Attorney, Agent, or Firm*—James D. Givnan, Jr.

[57] ABSTRACT

The tool disclosed includes a base for attachment to the wheel suspension system. Upright arms project from the tool base and carry an abutment assembly which is adjustable to support the end of different types of power cylinders in various operative relationships to the suspension system and which cylinders impart corrective bending forces to the suspension system.

2 Claims, 3 Drawing Figures

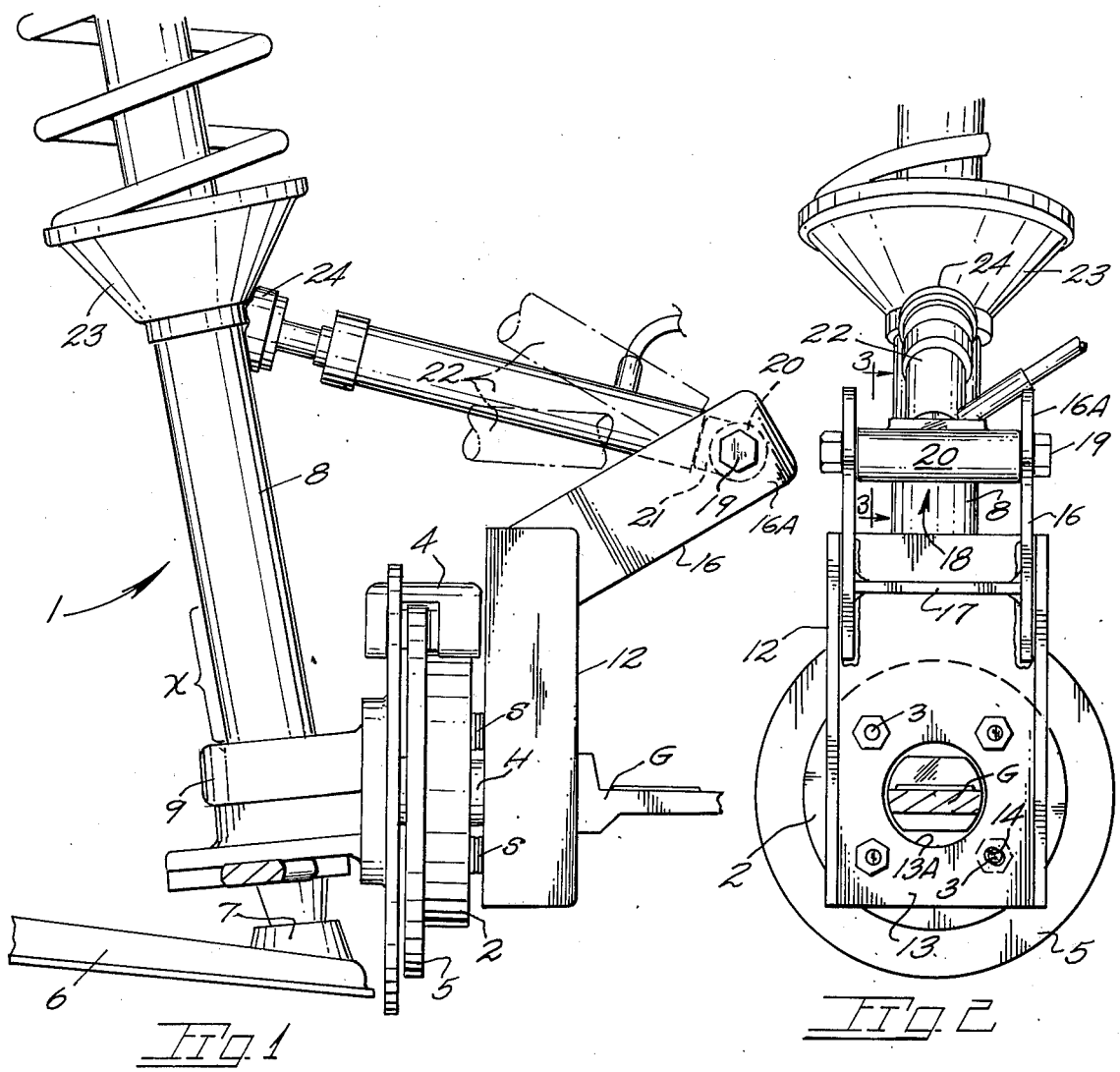
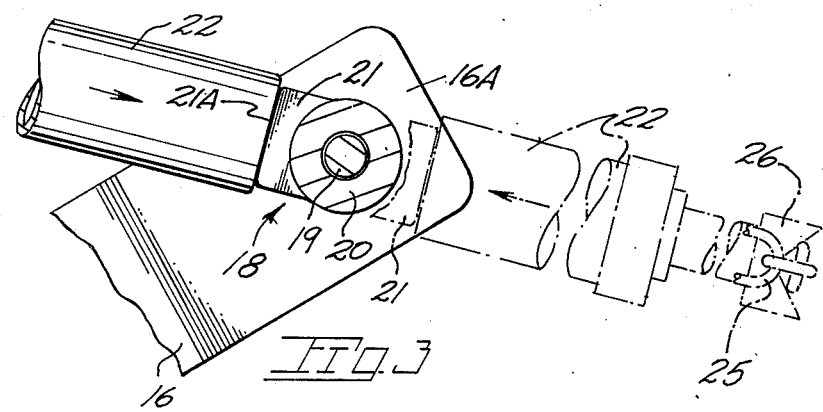

CAMBER ADJUSTING TOOL

BACKGROUND OF THE INVENTION

The present invention relates generally to automotive tools and specifically to a tool for attachment to an auto wheel assembly for purposes of camber adjustment.

Known to the art are various types of tools attachable to independently suspended wheels of an auto to impart corrective forces to a member or members of the wheel suspension system to restore desired wheel camber. Some of such tools impart corrective bending forces to a suspension member or members by means of a powered ram or cylinder.

A problem exists in correcting camber on autos utilizing a McPherson strut syspension member as found on the majority of foreign made autos. The above mentioned strut is widely used by both European and Japanese auto manufacturers and serves to provide, in one component, both suspension and motion dampening functions. The lower end of the above mentioned strut is somewhat susceptible however to bending upon forceful impact of the auto wheel with an obstruction, which bending results in incorrect wheel camber. In many instances, frame damage is also incurred, contributing to incorrect camber. While various camber adjusting tools have been proposed, none are known to be specifically directed toward camber adjustment of a McPherson suspension equipped auto nor can existing tools be readily modified for such use.

SUMMARY OF THE INVENTION

The present invention is embodied in a tool for attachment to the wheel plate of a McPherson strut suspension equipped auto to enable the imparting of corrective bending forces to the strut lower end.

The tool includes a base for attachment to the wheel plate, which base is apertured to receive the threaded wheel lugs or studs and also the projecting spindle hub. The lug receiving apertures in the base are slightly oversize to receive the most common lug patterns to render the tool usable on a wide range of autos. A base extension extends upwardly and outwardly from the base and carries an abutment assembly against which a powered component may be abutted for the application of bending forces to the wheel plate and associated suspension components. The powered component may utilize a strut mid portion as a support point when wheel camber is to be increased while a chain component permits opposite placement of the powered component relative to the tool base to enable camber corrections reducing wheel camber. The abutment assembly includes an adjustable fitting adjustable about a horizontal axis to best accomodate the type of powered component used and its relationship to the strut mid portion. Such powered components may be hydraulic or pneumatic cylinders or a mechanical instrumentality such as a jack.

Important objectives of the present tool include the provision of a single camber adjusting tool for use on most all autos utilizing a McPherson strut suspension component; the provsion of a tool for camber correction which does not require the disassembly of wheel suspension components but rather requires only the removal of wheel lug nuts and the wheel; the provision of a tool having an aperture for reception of the spindle hub to permit the attachment of a conventional sight guage thereon; the provision of a tool having a base apertured to receive most all lug patterns; the provision of a tool having an abutment assembly at its upper end which serves to receive a variety of powered components in various relationships which serve to impart corrective forces to the tool base; the provision of a tool of low cost, durable construction; the provision of a tool highly adaptable to use on several makes of automobiles with different makes and styles of power sources.

BRIEF DESCRIPTION OF THE DRAWING

In the accompanying drawing:

FIG. 1 is a front elevational view of a McPherson strut suspension system with the present tool in place;

FIG. 2 is a side elevational view of the right hand side of FIG. 1; and

FIG. 3 is a sectional view taken along line 3—3 of FIG. 2 and showing in broken lines optional placement of the power source for reducing wheel camber.

DETAILED DESCRIPTION OF THE PREFERRED EMBODIMENT

Reference numeral 1 of the drawing indicates generally a suspension system for an automotive wheel assembly consisting of a tire and wheel which are normally carried by a wheel mounting member or plate 2 by means of lug studs 3. Other conventional suspension system components include a disc brake unit 4, disc brake rotor 5, lower arm 6, ball joint 7, McPherson strut 8, and knuckle 9 which carries the spindle hub H. The lower segment of said strut at X is susceptible to bending forces imparted thereto from impact of the wheel assembly against a road obstruction. In most instances, damage is slight permitting correction by the application of bending forces applied with the present tool. Corrections up to one and one-half degrees of camber may be made without strut impairment.

With attention now to the present invention, the tool includes a base at 12 which may be of channel construction for purposes of strength. The base web 13 is apertured at 13A to receive spindle hub H of the wheel suspension system and permit the mounting of a conventional sight guage G thereon. Spaced about aperture 13A is a series of lug receiving openings as at 14 each somewhat oversize or larger than the diameter of the lug stud to permit the reception of the lug studs of different autos. As the spacing and size of lug studs is very similar in the majority of autos manufactured outside of the United States the oversize apertures 14 accept most all lug stud arrangements to enable a single tool to be used on all but a small portion of foreign made autos. Spacers at S provide desired clearance of base 12 from wheel mounting member 2.

Extending upwardly from base 12 is a base extension 16 which is shown as comprising a pair of inclined arms secured at their lower ends to base 12 with a gusset provided at 17. The arms 16 carry at their outer ends an abutment assembly, generally at 18, which provides an adjustable abutment for the power source selected. Said abutment assembly includes locking means 19, shown as a threaded fastener, which enables slight inward displacement of the arm ends at 16A to close frictionally against the opposite ends of a fitting 20 to prevent rotation of same. In place on said fitting is an abutment 21 configured for abutting contact with the power source selected. Said fitting may include a stud (not shown) for engagement with that type of portable hydraulic cylinder having a corresponding socket in the cylinder base. An abutting surface is indicated at 21A which may be operatively adjusted by loosening locking means 19. The outer or rod end of the power source, shown as a hydraulic cylinder 22 is provided with a resilient pad 24 and abuts the McPherson strut at the intersection of the strut tubular portion and a conical spring guide 23 of the strut. The cylinder disposition in FIGS. 1 and 2 is for increasing wheel camber while in FIG. 3 the power source 22 has been reorientated on the tool to impart bending forces decreasing wheel camber. In the latter arrangement the power source is coupled by means of a chain loop 25 wrapped about the strut intersection with chain runs passing above and below fitting 20 and therepast to engage the rod end of cylinder while the opposite or base end of cylinder 22 reacts against repositioned abutment 21. A V-shaped fitting 26 may be utilized to assure chain-rod engagement.

With the tool in place, to adjust camber the operator notes the camber reading on the hub attached guage and actuates the power source via suitable valve controls (not shown) until the desired reading is indicated. In use the base of the tool is supported so as to permit a portion of the auto's weight approximately five percent to be supported by the base. Details of camber adjustment are believed to be apparent to one skilled in the art and accordingly are superfluous for present purposes.

While I have shown but one embodiment of the invention it will be apparent to those skilled in the art that the invention may be embodied still otherwise without departing from the spirit and scope of the claimed invention.

Having thus described the invention what is desired to be secured under a Letters Patent is:

1. A tool for adjusting the camber of an automobile wheel of an automobile having a strut type wheel suspension system, said tool comprising, a base for attachment to the wheel carrying member of the automobile suspension system, said base defining an opening within which the spindle housing of the suspension system may be received and which enables the temporary attachment of a camber sight gauge to the spindle housing, said base including upwardly and outwardly inclined arms, an abutment assembly carried at the upper distal ends of said arms and including a fitting having an abutment surface thereon, fastener means extending intermediate said arms and mounting said fitting therebetween and permitting rotational positioning and locking of said fitting and the abutment surface thereon about a horizontal axis to locate said surface normal to the inclined axis of a portable hydraulic cylinder locatable intermediate said abutment assembly and the upper end of the strut associated with the wheel regardless of variances in length such struts utilized on different makes and models of automobiles and resulting cylinder inclination changing therebetween to enable remedial bending of the strut for camber adjustment.

2. The tool claimed in claim 1 wherein said fastener means acts on said arms to close same into frictional engagement with the fitting to lock the latter in a selected position.

* * * * *